United States Patent
Smith

(10) Patent No.: US 10,293,396 B2
(45) Date of Patent: May 21, 2019

(54) VIEWING TOOL USED IN THE OPERATION OF HAND BENDING PIPE

(71) Applicant: Jason Edward Smith, Pasadena, CA (US)

(72) Inventor: Jason Edward Smith, Pasadena, CA (US)

(*) Notice: Subject to any disclaimer, the term of this patent is extended or adjusted under 35 U.S.C. 154(b) by 0 days.

(21) Appl. No.: 15/731,273

(22) Filed: May 17, 2017

(65) Prior Publication Data
US 2018/0333759 A1    Nov. 22, 2018

(51) Int. Cl.
*B21D 7/02* (2006.01)
*B21D 7/06* (2006.01)
*G02B 5/08* (2006.01)
*B21D 7/14* (2006.01)
*B21D 7/16* (2006.01)

(52) U.S. Cl.
CPC .............. *B21D 7/063* (2013.01); *B21D 7/02* (2013.01); *B21D 7/14* (2013.01); *G02B 5/08* (2013.01); *B21D 7/16* (2013.01)

(58) Field of Classification Search
CPC ............. B21D 7/063; B21D 7/16; G02B 5/08
See application file for complete search history.

(56) References Cited

U.S. PATENT DOCUMENTS

| | | | | |
|---|---|---|---|---|
| 3,561,126 A * | 2/1971 | Beckwell | ................. | B21D 7/16 116/246 |
| 3,915,457 A * | 10/1975 | Casey | ................. | A63B 24/0003 434/252 |
| 4,132,100 A * | 1/1979 | Schuler | ................. | B21D 7/063 72/217 |
| 4,184,278 A * | 1/1980 | Fournet | ................. | A47G 1/02 40/661 |
| 4,750,811 A * | 6/1988 | Beyer | ................. | G02B 5/08 359/602 |
| 4,979,323 A * | 12/1990 | Wenkman | ................. | A47G 1/06 40/597 |
| 5,669,258 A * | 9/1997 | Luebke | ................. | B21D 7/063 33/377 |
| 6,216,377 B1 * | 4/2001 | Painsith | ................. | A47G 1/06 40/750 |
| 6,224,220 B1 * | 5/2001 | Duroux | ................. | B60R 1/072 359/872 |
| 6,253,595 B1 * | 7/2001 | Lewis, Jr. | ................. | B21D 7/12 72/31.05 |
| 2004/0257589 A1 * | 12/2004 | Warnemunde | ........... | B21D 7/14 356/602 |
| 2017/0095849 A1 * | 4/2017 | Nobles | ................. | B21D 7/14 |

* cited by examiner

*Primary Examiner* — Charlie Y Peng

(57) ABSTRACT

One embodiment of a mirror or reflective surface is set onto a ridged material. The mirror or reflective surface is set at a precise angle by support legs that inserted into holes in the ridged material. The support legs can also be placed in storage notches in ridged material.

6 Claims, 3 Drawing Sheets

VIEWING TOOL USED IN THE OPERATION OF HAND BENDING PIPE

BACKGROUND OF THE INVENTION

There are mirrors are sold for the purpose of applying makeup. The mirror embodiment in this document has been crafted to be at a precise angle when set on the ground, so the user can look down onto the mirror and see a ground level view of work that is being done. It is beneficial to have the mirror placed at this angled view while performing pipe bending.

A pipe bender for electrical conduit must place their head to the ground so that they can have an eye level view of the ground in order to make a perfect measurement.

In order to make perfect bends one must measure from the ground to the bottom of the pipe. This method of measuring provides a useful and time saving product. There are no such tools on the market that disclose the claimed embodiment.

The preferred embodiment has a mirror or reflective surface supported at a precise angle to see ground level view when looking down onto the mirror or reflective surface. The angle of the mirror provides a view is for purpose of determining perfect measurements.

This embodiment is useful in the trades and allows user to verify perfect measurements from the ground to the bottom of a pipe that is being bent without the need for constant up and down on hands and knees. The embodiment allows user an easy way to make perfect kicked 90-degree bend or to check an offset bend. A user no longer needs to depend on a helper for measuring while a tradesperson bends or gets up and down on hands and knees.

The mirror allows a tradesperson to bend perfectly measured bends alone and without having to get up and down from hands and knees thereby saving time and energy.

The mirror shows a view that cannot be seen without a user placing their head down to the ground and looking horizontally at the bent tube.

The mirror has its own storage area for the legs where the legs are quickly available for practical use.

BRIEF DESCRIPTION OF THE SEVERAL VIEWS OF THE DRAWING(S)

DRAWINGS—REFERENCE NUMERALS

1—A mirror or reflective surface.
2—Legs.
3—Notches.
4—Holes or cut-outs.
5—Ridged material.

DETAILED DESCRIPTION—FIG. 1, FIG. 2 AND FIG. 3

Figure 1:
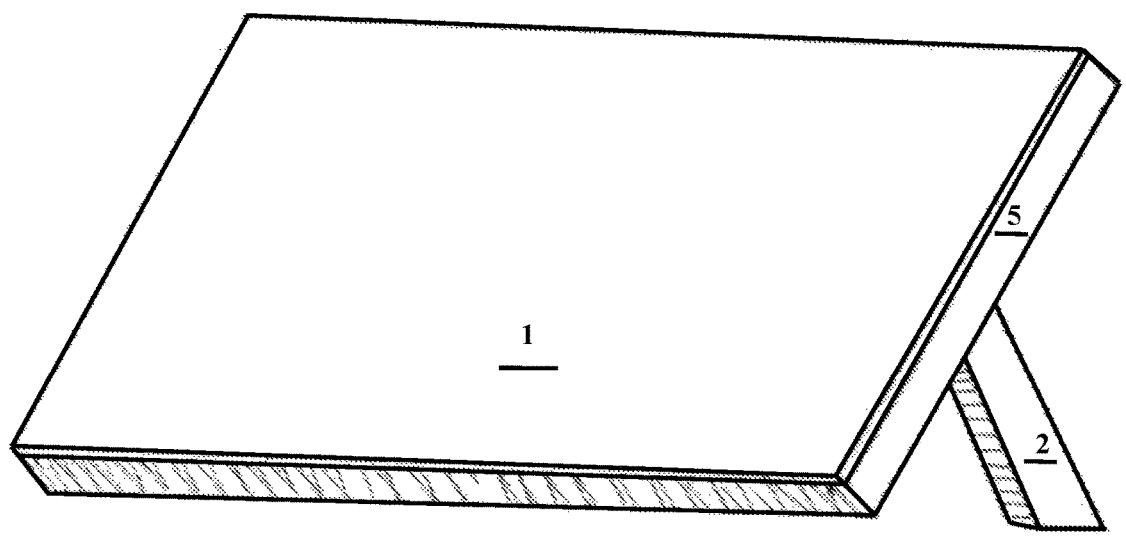
FIG. 1 is a perspective view of the front and partial side of the viewing tool.

FIG. 1 is a perspective view of the front and partial side of the viewing tool. A mirror or reflective surface 1 attached to the front of a ridged material 5. There are also two detachable legs 2 that support the mirror or reflective surface at a precise angle. One of which is shown in FIG. 1. The other leg 2 is hidden behind the tool at this angle of view.

Figure 2:
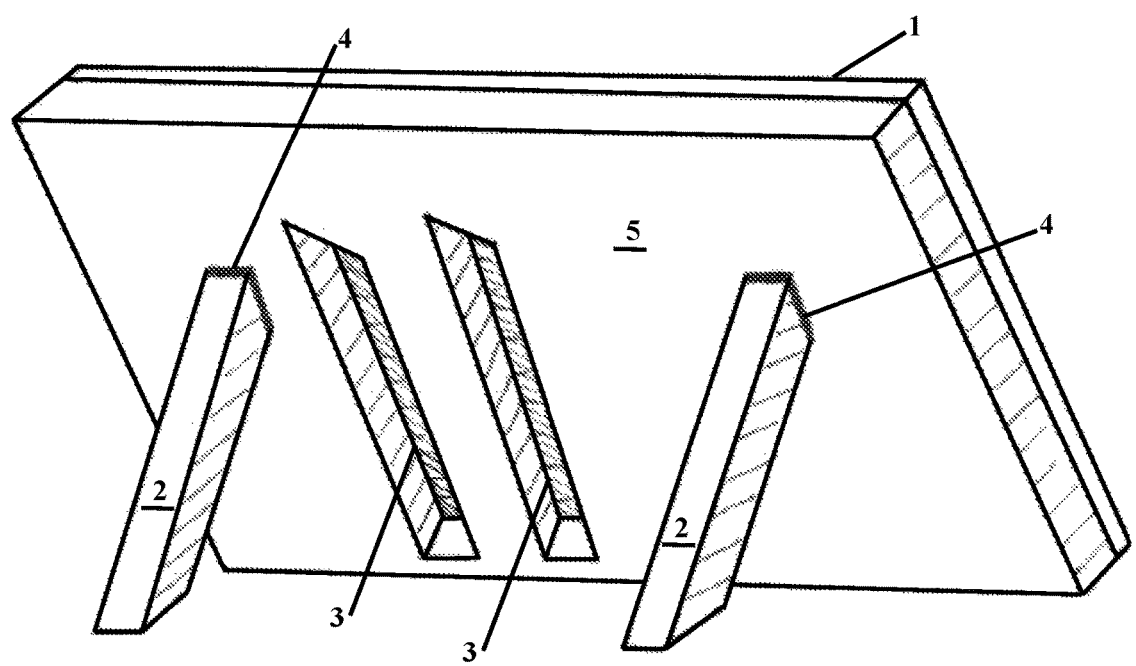
FIG. 2 is a perspective view of the back and partial side of the viewing tool.

FIG. 2 is a perspective view of the back and partial side of the viewing tool. The ridged material 5 is shown with the mirror or reflective surface 1 attached to front of the ridged material 5. The back side of the ridged material 5 has cut-outs 4 that allow the legs 2 to be inserted when using the tool. There are also notches 3 for the legs 2 to be used when storing the tool.

Figure 3:
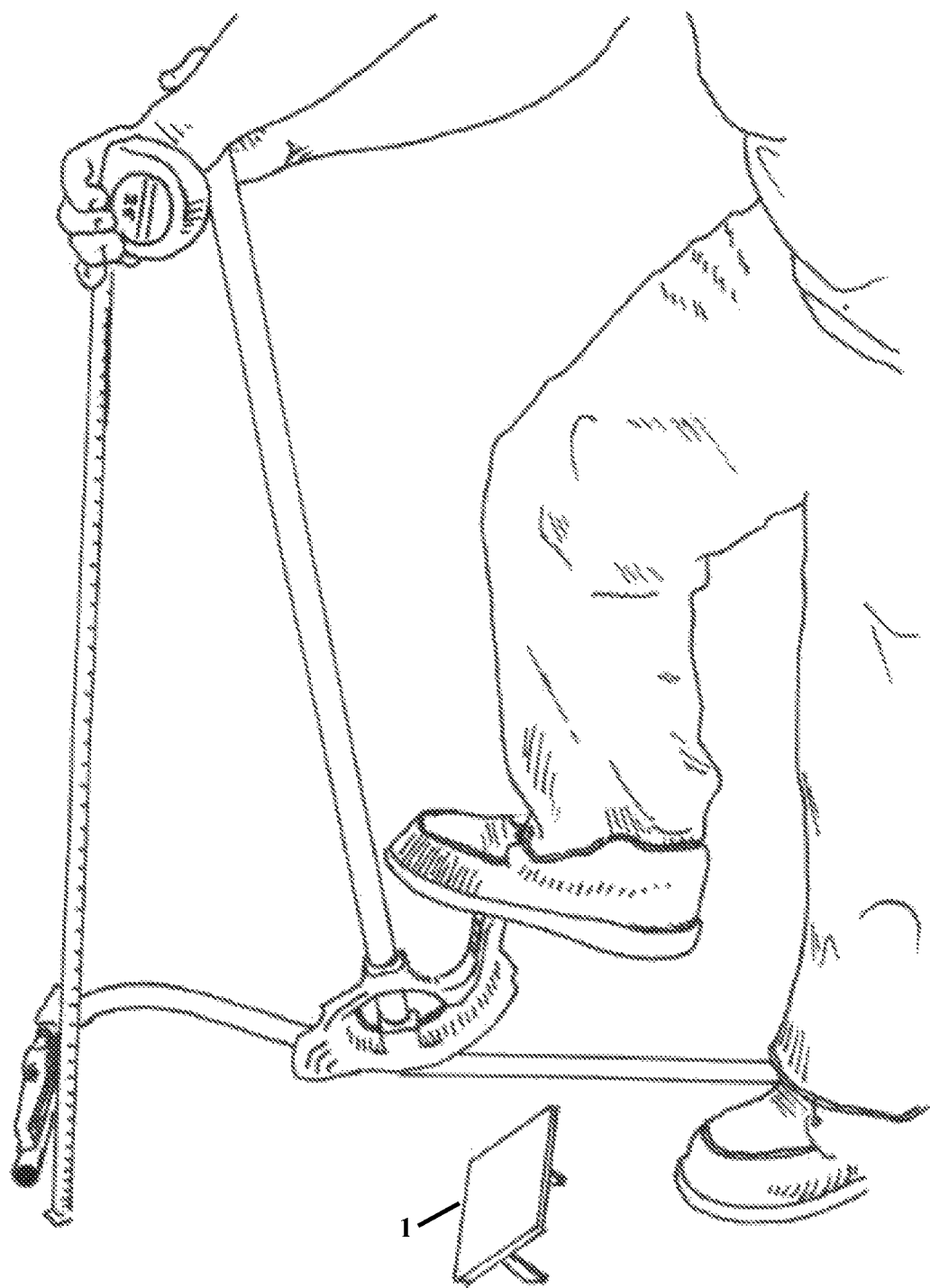
FIG. 3 is a drawing of the mirror as being used in the field.

FIG. 3 is a drawing of the mirror as being used in the field. The figure shows the complexity of this embodiment. You can see the tradesperson holding the bender in one hand and a tape measure in the other hand. The embodiment allows the tradesperson to see the measurement from the ground to the bottom of the pipe, and the tradesperson can also see their level that is required in making sure the pipe remains level for perfect measurements.

Operation

To use the mirror a user would remove the legs 2 from the storage notches 3 that are cut into ridged material 5 behind the with mirror or reflective surface 1. A user then inserts the legs 2 into the holes or cut-outs 4 that are cut into the ridged material 5 with mirror or reflective surface 1 set onto the ridged material 5, and the tool is now set on the ground so that the mirror or reflective surface 1 is facing the work being done. The user is then able look down onto tool and see a ground level view for the purpose of getting a perfect measurement from the ground to the bottom of pipe that is being bent without having the user get down and physically look at same view.

Although the description describes a certain stand set at a precise angle. This embodiment should not be limited by said description. The embodiment may have alternative methods, including but not limited to supports such as legs on hinges, or a cover that folds to a triangle designed to meet a precise angle.

The invention claimed is:

1. A method for using a tube bending viewing tool comprising:
    joining a mirror or reflective surface onto a ridged material;
    setting at least one removable support leg into a back of said ridged material;
    setting said mirror or reflective surface at a precise angle by adjusting said at least one removable supporting leg on a ground surface;
    inserting a section of pipe through a bender at a measured length of said pipe;
    using said precise angle for looking down onto said mirror or reflective surface to obtain a ground level view of said pipe in said pipe and said bender when looked down onto said mirror or reflective surface;
    bending said pipe with said bender while viewing said bending through said mirror or reflective surface, and stopping said bending when an observed angle of bending said pipe is viewed through said mirror or reflective surface.

2. The method for using a tube bending viewing tool according to claim 1, wherein said viewing tool is configured for use by a tradesperson performing pipe bending by hand.

3. The method for using a tube bending viewing tool according to claim 1, includes at least two removable supporting legs that are configured and set into said ridged material.

4. The method for using a tube bending viewing tool according to claim 1, wherein said ridged material has at least one hole configured for securing said removable leg therein to support said mirror or reflective surface at said precise angle.

5. The method for using a tube bending viewing tool according to claim 4, wherein said ridged material further includes at least one notch wherein said removable leg is inserted to store said removable leg.

6. The method for using a tube bending viewing tool according to claim 5, wherein said rigid material includes two holes and two notches wherein said two removable legs are inserted for storage.

* * * * *